Dec. 14, 1926.  1,611,013
O. G. FRANCKE
CAR DOOR
Original Filed August 6, 1924

Otto G. Francke,
INVENTOR

BY Victor J. Evans
ATTORNEY

WITNESS:

Patented Dec. 14, 1926.

1,611,013

UNITED STATES PATENT OFFICE.

OTTO G. FRANCKE, OF BRACKENRIDGE, PENNSYLVANIA.

CAR DOOR.

Application filed August 6, 1924, Serial No. 730,472. Renewed October 6, 1926.

This invention relates to doors for freight cars and the like, one object being to provide easily operated smooth running doors which may be arranged in pairs and operated from either side of the car so as to simultaneously open or close.

Another object of the invention is the provision of a car door and operating means therefor which are simple in construction, positive and reliable in operation and which will remain in either open or closed position.

With the above and other objects in view, the invention further includes the following novel features and details of construction, to be hereinafter more fully described, illustrated in the accompanying drawings and pointed out in the appended claims.

In the drawings:—

Figure 1:
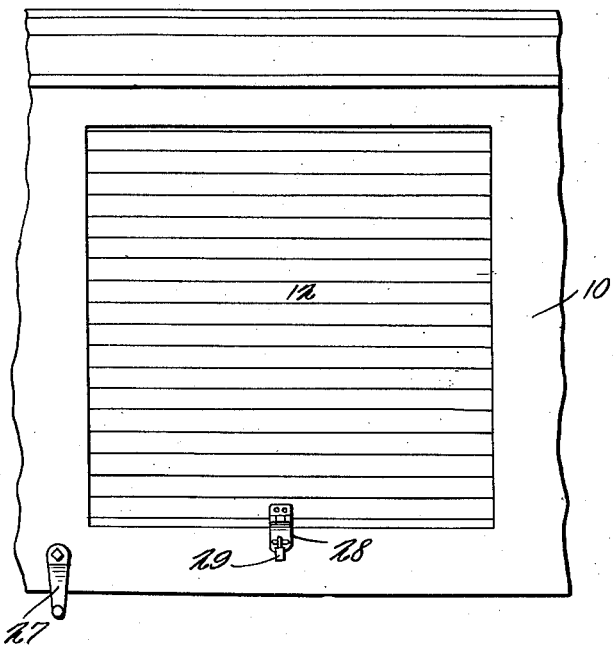
Figure 1 is a side elevation of a portion of a freight car with the door in closed position.
Figure 3:
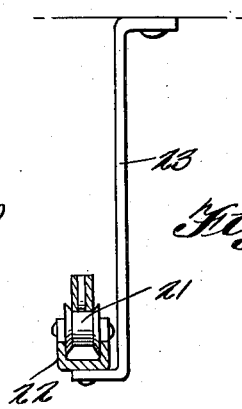
Figure 3 is an enlarged fragmentary view showing one of the track supporting brackets with the track in section.

Referring to the drawings in detail wherein like characters of reference denote corresponding parts, the reference character 10 indicates a portion of a freight car, the opposite sides of which are provided with door openings 11.

These openings are adapted to be closed by doors 12, the latter being of sectional formation and comprising a plurality of separate sections 13. The opposite edges of these sections are provided with tongues 14 and shoulders 15, the said tongues and shoulders being reversely arranged so as to provide interfitting edges between the sections. The sections 13 are flexibly connected and for this purpose there are provided sprocket chains 16 which are secured to the door sections 13 and which pass over sprockets 17. The chains 16 are spaced so as to extend vertically of the doors 12 adjacent each side edge thereof and which are endless, including upper flights 18 and lower flights 19. The flights 19 and the sprockets 17 around which the lower flights pass are disposed beneath the floor 20 of the car, while the upper flights pass over grooved rollers 21. These rollers are mounted in suitable bearings provided along the upper edges of a horizontally disposed channel beam 22 which is suspended from the top of the car by means of brackets 23. The rollers 20 and beam 22 thus provide a track or guide for the chain which is supported by the brackets 23 just mentioned.

Figure 2:
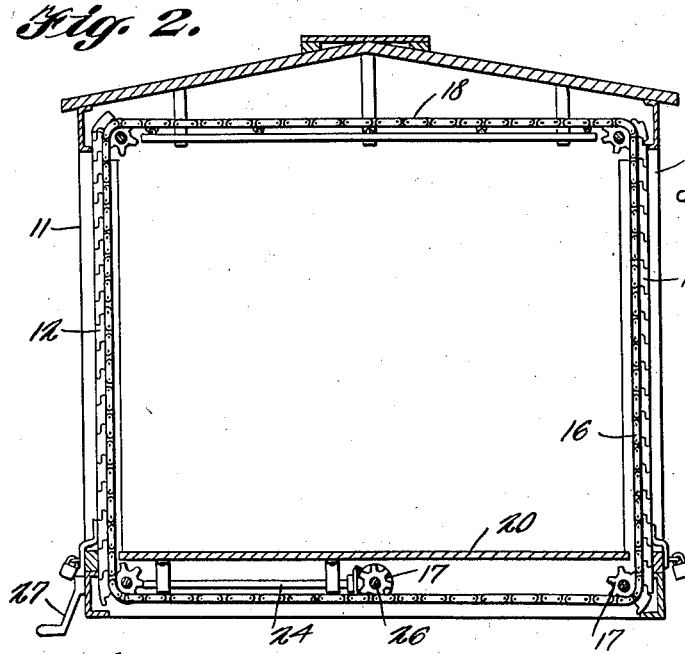
Figure 2 is a transverse sectional view of the same.
Figure 4:
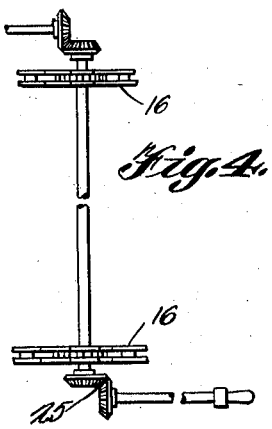
Figure 4 is a fragmentary plan view showing a portion of the door operating mechanism, the view being taken on a plane directly beneath the car floor.

It will be apparent from an inspection of Figure 2 of the drawings that when the chain is moved, the doors 12 will be moved in opposite directions, one of the doors moving upward and assuming a horizontal position above the top of the door openings and being supported by the rollers 21 and brackets 23, while the other door will move downward beneath the floor 20.

For the purpose of operating the chain there are provided spaced shafts 24 which extend transversely of the car. The inner ends of these shafts are connected by means of gears 25 to the ends of an intermediate shaft 26 which supports two of the sprockets 17 around which the chain 16 passes. The shafts 24 extend in opposite directions beyond the side edges of the car and are provided with means whereby they may be rotated. This means as shown may consist of crank arms or handles 27. By means of the handles 27 the doors may be operated as previously described. If desired, the doors may each be provided with a hinged hasp 28 and a suitable lock 29.

The invention is susceptible of various changes in its form, proportions and minor details of construction and the right is herein reserved to make such changes as properly fall within the scope of the appended claims.

Having described the invention what is claimed is:—

1. The combination with a car having door openings upon opposite sides thereof, of doors formed of flexibly connected sections, spaced endless sprocket chains connected to the doors and disposed transversely of the car above and below the openings, sprocket wheels engaging the chains and means operatively associated with the sprocket wheels whereby the latter may be rotated to move the doors to open or closed position.

2. The combination with a car having door openings upon opposite sides thereof, of doors formed of flexibly connected sections, spaced endless sprocket chains connected to the doors and disposed transversely of the car above and below the openings, sprocket wheels engaging the chains, rotatable shafts extending longitudinally of the car for supporting the sprocket wheels, one of said shafts being disposed substantially central of the longitudinal center of the car, shafts extending transversely of the car at each end of the central shaft, gears operatively connecting the inner ends of the transverse shafts with said central shaft and operating handles secured to the outer ends of the transverse shafts.

3. The combination with a car having door openings upon opposite sides thereof, of doors formed of flexibly connected sections, spaced endless sprocket chains connected to the doors and disposed transversely of the car above and below the openings, channel beams extending transversely of the car beneath the upper flights of the chains, means for supporting the beams, grooved chain engaging rollers carried by the beams, sprocket wheels engaging the chains and means operatively associated with the sprocket wheels whereby the latter may be rotated to move the doors to open or closed position.

In testimony whereof I affix my signature.

OTTO G. FRANCKE.